J. LOVASS & J. GANZ.
STREET CAR FENDER.
APPLICATION FILED SEPT. 16, 1908.
919,046. Patented Apr. 20, 1909.
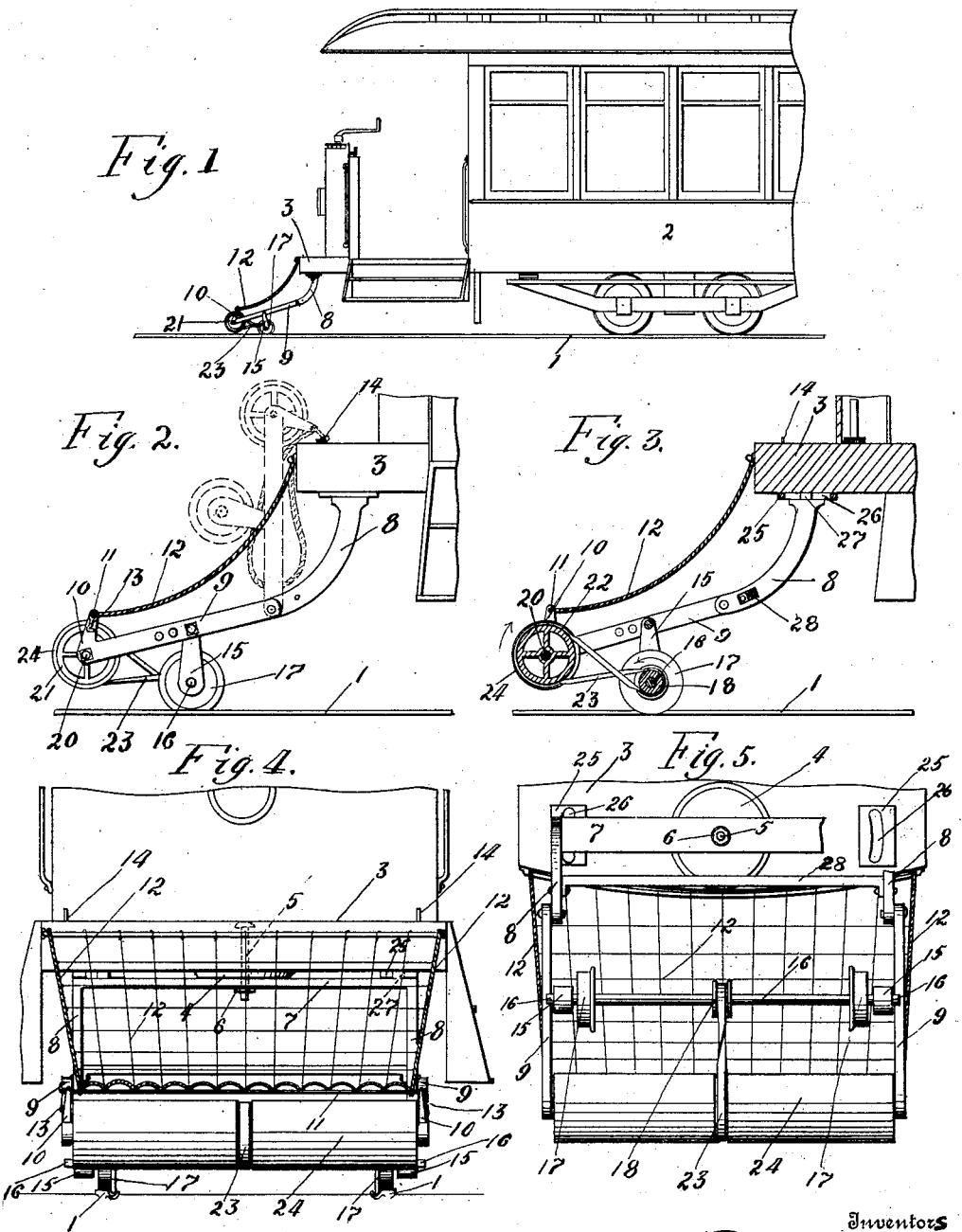

UNITED STATES PATENT OFFICE.

JOHN LOVASS AND JOSEPH GANZ, OF AMBRIDGE, PENNSYLVANIA, ASSIGNORS OF ONE-THIRD TO EDWIN GOODMAN, OF AMBRIDGE, PENNSYLVANIA.

STREET-CAR FENDER.

No. 919,046.     Specification of Letters Patent.     Patented April 20, 1909.

Application filed September 16, 1908. Serial No. 453,215.

*To all whom it may concern:*

Be it known that we, JOHN LOVASS and JOSEPH GANZ, subjects of the King of Hungary, residing at Ambridge, in the county of Beaver and State of Pennsylvania, have invented certain new and useful Improvements in Street-Car Fenders, of which the following is a specification, reference being had therein to the accompanying drawing.

This invention relates to street car fenders, and the objects of our invention are, first to provide a life saving device applicable to various types of street cars; second, to prevent injury to persons accidentally run down by a car; third, to provide a novel street car fender that will be normally retained in such position relative to a track that a person or object struck by the fender will be deposited thereon; fourth, to provide a strong, durable and inexpensive fender that will be normally retained in close proximity to the track in a direct alinement therewith similar to the trucks of the car irrespective of the inclination of the car or track.

We obtain the above objects by a life saving device that will now be described in detail and afterward claimed.

In the drawings, Figure 1 is a side elevation of our fender applied to a car. Fig. 2 is an enlarged elevation of the same, illustrating in dotted lines the fender in a closed or folded position. Fig. 3 is a longitudinal sectional view of the same. Fig. 4 is a front elevation of the fender, and Fig. 5 is a bottom plan.

In the drawings, the reference numeral 1 designates the track upon which a car 2 is adapted to travel. The platform 3 of the car upon the under side thereof is provided with a circular bearing plate 4 having a central depending pin 5 provided with a nut 6 for pivotally supporting a transverse beam 7. The ends of the beam 7 are provided with depending forwardly curved brackets 8, and pivotally connected to the lower ends of said brackets are forwardly extending downwardly-inclined arms 9 having the free ends thereof provided with vertical extensions 10. These extensions support a transverse rod 11 and connected to said rod is a flexible support 12 preferably constructed of strong and durable ropes or cables. This support is connected to the platform 3, and when the said arms 9 are folded upwardly, as shown in Fig. 2 of the drawings, the support folds against the end of the platform 3. To maintain the fender in a folded position the extensions 10 are provided with hooks 13 for engaging terrets 14 carried by the platform 3.

The arms 9 are provided with adjustable hangers 15 having rotatable axles 16, upon which are mounted flanged wheels 17 adapted to travel upon the track 1. The rotatable axle 16 is also provided with a flanged belt wheel 18 arranged intermediate the ends of the axle.

The forward ends of the arms 9 carry a rotatable shaft 20, and mounted upon said shaft are two rollers 21 and a belt wheel 22, said belt wheel being arranged between the rollers 21 and provided with a belt 23, which passes over the belt wheel 18. The belt 23 is twisted whereby the shaft 20 will be rotated in an opposite direction from that of the axle 18.

The rollers 21 are covered with rubber 24 or a similar resilient material, whereby when a person is struck by the revolving rollers 21 the person will not be injured, but will be immediately precipitated into the support 12. Since the wheels 17 are free to travel upon the track 1 and maintain the rollers 21 a prescribed distance above the track, it is necessary that the brackets 8 be free to swing in a horizontal plane and conform to the curvature of the track, consequently we have provided the beam 7. To brace and guide this beam during movement, we provide the underneath side of the platform 3 with plates 25 having segment shaped grooves 26 formed therein, which receive upwardly extending compound pins 27 carried by the beam 7. The depending brackets 8 are connected by a transverse bar 28 thus adding rigidity to the device.

It is apparent from the novel construction of our fender that a person struck by the rollers 21 will be immediately thrown into the support 12 and will be safely carried thereby until the motorman has stopped the car 2. The proclivity of the rollers 21 is to force a person or object outwardly and upwardly, consequently it is impossible for a person to contact with the trucks of a car.

It is thought that our invention will be fully understood witout further description, and that various changes can be made in the safety device without departing from the scope of the invention.

Having now described our invention, what we claim as new is:

1. In a safety device the combination with a car adapted to travel upon a track, of a pivoted beam carried by said car, depending forwardly curved brackets carried by the ends of said beam, grooved plates carried by said car, upwardly extending pins carried by the ends of said beam and engaging in said grooved plates, arms pivotally connected to the lower ends of said brackets and adapted to swing upwardly to a vertical position, adjustable hangers carried by said arms, an axle journaled in said hangers, wheels mounted upon said axle and adapted to travel upon a track, a belt wheel mounted upon said axle, a shaft journaled in the forward ends of said arms, rubber covered rollers mounted upon said shaft, a belt wheel mounted upon said shaft between said rollers, a belt mounted upon said belt wheels and adapted to revolve said rollers in a positive direction from said axle, a flexible support connecting the forward ends of said arms with said car, and means carried by said car for holding said arms in a vertical position, substantially as described.

2. In a safety device the combination with a car adapted to travel upon a track, of a pivoted beam carried by said car, depending curved brackets carried by the ends of said beam, arms pivotally connected to the lower ends of said brackets and adapted to swing upwardly to a vertical position, adjustable hangers carried by said arms, an axle journaled in said hangers, wheels mounted upon said axle and adapted to travel upon a track, a belt wheel mounted upon said axle, a shaft journaled in the forward ends of said arms, rubber covered rollers mounted upon said shaft, a belt wheel mounted upon said shaft between said rollers, a belt mounted upon said belt wheels and adapted to revolve said rollers in a positive direction from said axle, a flexible support connecting the forward ends of said arms with said car, and means carried by said car for holding said arms in a vertical position substantially as described.

3. In a safety device the combination with a car adapted to travel upon a track, of a pivoted beam carried by said car, depending curved brackets carried by the ends of said beam, arms pivotally connected to the lower ends of said brackets and adapted to swing upwardly to a vertical position, adjustable hangers carried by said arms, an axle journaled in said hangers, wheels mounted upon said axle and adapted to travel upon said track, a belt wheel mounted upon said axle, a shaft journaled in the forward ends of said arms, rollers mounted upon said shaft, a belt wheel mounted upon said shaft between said rollers, a belt mounted upon said belt wheels and adapted to revolve said rollers in a positive direction from said axle, and a flexible support connecting the forward ends of said arms with said car, substantially as described.

In testimony whereof we affix our signatures in the presence of two witnesses.

JOHN LOVASS.
JOSEPH GANZ.

Witnesses:
E. GOODMAN,
K. H. BUTLER.